United States Patent
Sato

(10) Patent No.: US 7,002,706 B2
(45) Date of Patent: Feb. 21, 2006

(54) IMAGE READING APPARATUS AND METHOD

(75) Inventor: Yuichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 932 days.

(21) Appl. No.: 09/907,162

(22) Filed: Jul. 17, 2001

(65) Prior Publication Data

US 2002/0054400 A1 May 9, 2002

(30) Foreign Application Priority Data

Jul. 18, 2000 (JP) .............................. 2000-217713

(51) Int. Cl.
*H04N 1/04* (2006.01)
(52) U.S. Cl. ........................ 358/1.2; 358/474; 358/487
(58) Field of Classification Search .............. 348/218.1; 355/75; 358/487, 506, 1.2, 474, 505
See application file for complete search history.

(56) References Cited

U.S. PATENT DOCUMENTS 6,239,883 B1 * 5/2001 Lam et al. ................... 358/475

* cited by examiner

*Primary Examiner*—Thomas D. Lee
(74) *Attorney, Agent, or Firm*—Morgan & Finnegan, LLP

(57) ABSTRACT

An image reading apparatus for reading by an image sensing element an original held by an original holder while performing pixel shifting operation detects the feature point of the original holder, specifies the original position on the basis of the detected feature point, and performs the first reading of the original. After reading, the apparatus shifts the relative positions of the optical image of the original and the image sensing element by a predetermined amount. Then, the apparatus detects the feature point of the original holder again, specifies the original position on the basis of the detected feature point, and performs the second reading of the original. The apparatus synthesizes the two read original images to generate one image.

28 Claims, 10 Drawing Sheets

IMAGE READING APPARATUS AND METHOD

FIELD OF THE INVENTION

The present invention relates to an image reading apparatus and method capable of obtaining a high-resolution image by synthesizing images read by pixel shifting operation in the main scan direction and, more particularly, to an image reading apparatus capable of aligning images in the sub-scan direction.

BACKGROUND OF THE INVENTION

High-resolution image reading by pixel shifting operation has conventionally been proposed as a method of increasing the resolution of an image sensing apparatus such as a TV camera by using an area sensor. There have also been proposed image scanners which use line sensors and can obtain a high-resolution image by synthesizing images read in two reading operations while performing pixel shifting operation in the main scan direction.

However, a reading mechanism with high repeat precision is required to obtain a high-quality image by synthesizing images read a plurality of number of times at high resolution while suppressing a pixel deviation.

For example, reading an image at a resolution of 1,200 dpi requires a precision enough for a pixel pitch of 21.7 [$\mu$m]. Even in a case wherein a pulse motor is used as a carriage driving source and controlled by the number of pulses, if the precisions of the reading position which depends on the carriage driving mechanism, the rigidity and play of the frame of the image scanner, and temperature characteristics are insufficient, the scan position of the first reading in the sub-scan direction and the read position of the second reading in the sub-scan direction deviate from each other, failing to obtain high resolution or degrading the image quality.

SUMMARY OF THE INVENTION

The present invention has been made in consideration of the above situation, and has as its object to provide an image reading apparatus and method capable of increasing the image reading resolution with high precision under simple control using a conventional driving mechanism without causing misalignment in image synthesis.

According to the present invention, the foregoing object is attained by providing an image reading method of reading by an image sensing element an original held by an original holder while shifting pixels, comprising: a first detection step of detecting a feature point of the original holder; a first reading step of specifying a position of the original on the basis of the feature point detected in the first detection step and reading the original; a pixel shifting step of shifting relative positions of an optical image of the original and the image sensing element by a predetermined amount; a second detection step of detecting the feature point of the original holder at the position shifted in the pixel shift step; a second reading step of specifying the position of the original on the basis of the feature points detected in the second detection step and reading the original; and a synthesis step of synthesizing the images read in the first and second reading steps.

According to the present invention, the foregoing object is also attained by providing an image reading method of reading by an image sensing element an original held by an original holder while shifting pixels, comprising: a first reading step of reading the original and a predetermined region including a feature point of the original holder; a first detection step of detecting the feature point of the original holder from image data of the original read in the first reading step; a pixel shifting step of shifting relative positions of an optical image of the original and the image sensing element by a predetermined amount; a second reading step of reading the original and the predetermined region including the feature point of the original holder at the position shifted in the pixel shift step; a second detection step of detecting the feature point of the original holder from image data of the original read in the second reading step; and a synthesis step of synthesizing the images read in the first and second reading steps on the basis of the feature points of the image holder that are detected in the first and second detection steps.

Further, the foregoing object is also attained by providing an image reading apparatus comprising: an original holder for holding an original; an image sensing element; a detector for detecting a feature point of the original holder; a pixel shifting circuit for shifting relative positions of an optical image of the original and the image sensing element by a predetermined amount; a controller for causing the detector to detect the feature point, specifying a position of the original on the basis of the detected feature point, and causing the image sensing element to read the original before the pixel shifting circuit shifts the relative positions and every time the pixel shifting circuit shifts the relative positions; and a synthesizer for synthesizing original images read by the image sensing element at a plurality of relative positions.

Furthermore, the foregoing object is also attained by providing an image reading apparatus comprising: an original holder for holding an original; an image sensing element; a pixel shifting circuit for shifting relative positions of an optical image of the original and the image sensing element by a predetermined amount; a controller for causing the image sensing element to read the original and a predetermined region including a feature point of the original holder before the pixel shifting circuit shifts the relative positions and every time the pixel shifting circuit shifts the relative positions; a detector for detecting the feature point of the original holder on the basis of image data of the read original; and a synthesizer for synthesizing original images read by the image sensing element at a plurality of relative positions on the basis of the feature point detected by the detector.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

(First Embodiment)

Figure 1:
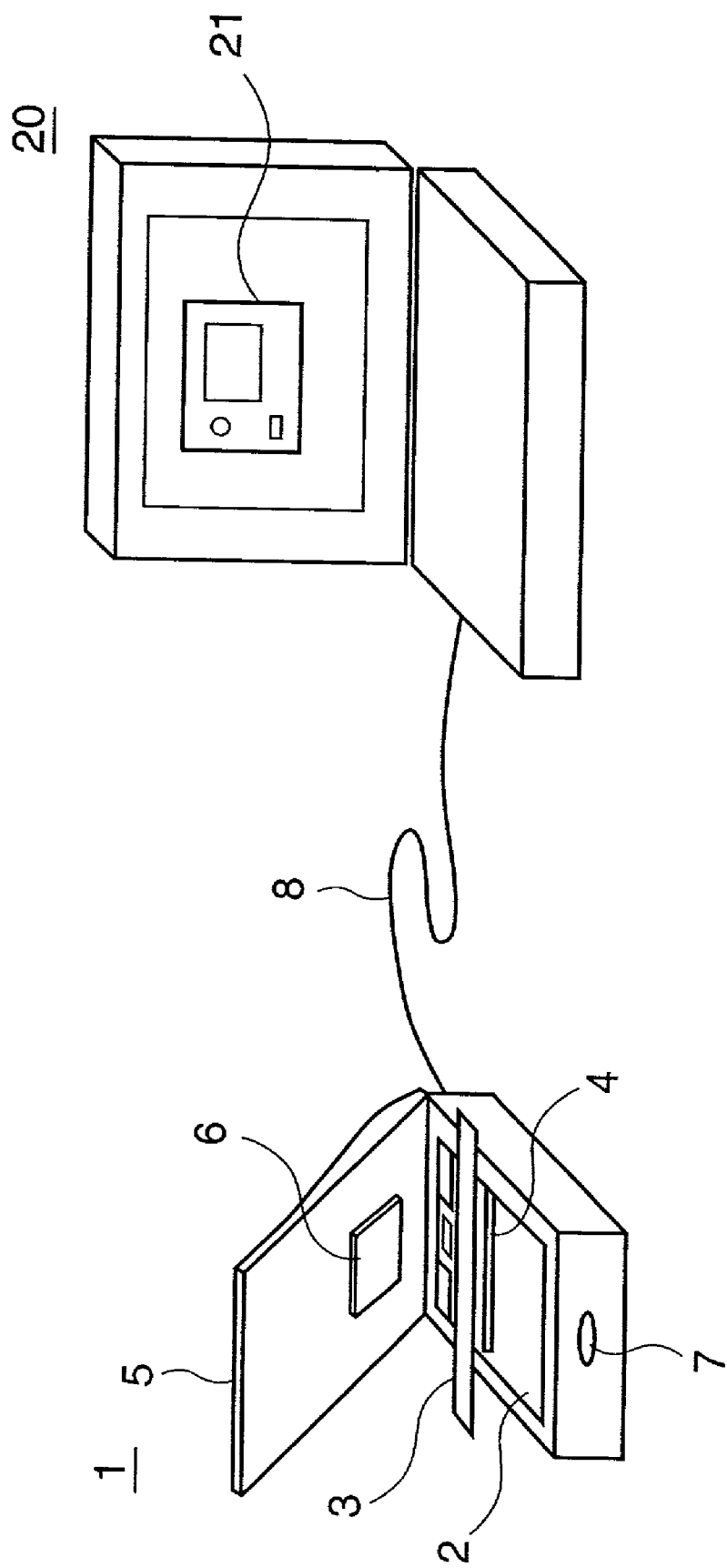
FIG. 1 is a schematic view showing an image reading apparatus according to a first embodiment of the present invention.
Figure 2:
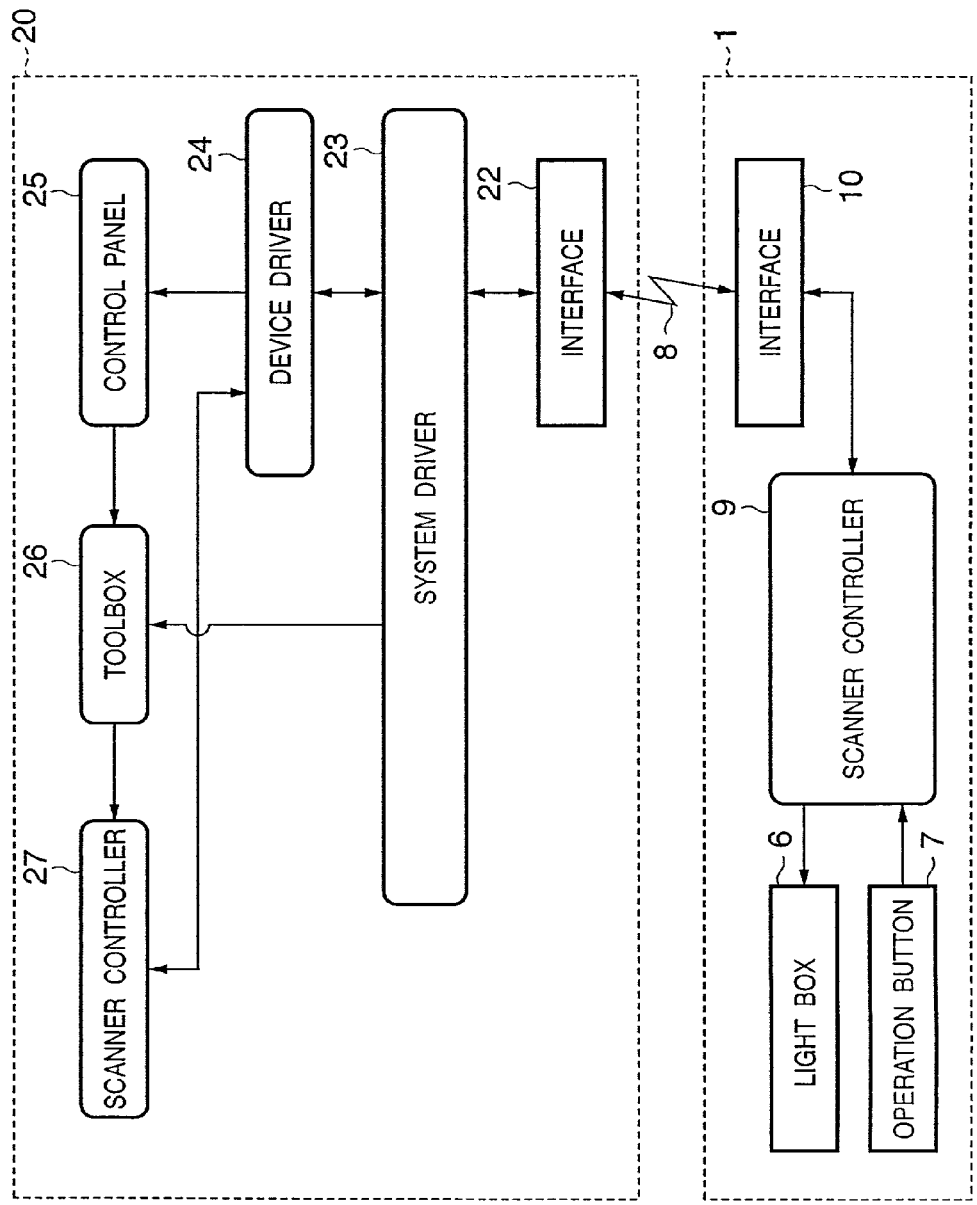
FIG. 2 is a block diagram showing the system configuration of software according to the first embodiment of the present invention.

FIG. 1 is a schematic view showing an image reading system according to the first embodiment of the present invention. FIG. 2 is a block diagram showing the system configuration of software according to the first embodiment.

In FIGS. 1 and 2, reference numeral 1 denotes an image reading apparatus (scanner in the first embodiment); 2, a platen glass for holding an original; 3, a transparent original such as a film; 4, a film holder for holding the transparent original 3 on the platen glass 2; 5, a pressing plate; 6, a light box (light source) for illuminating the surface of the transparent original; 7, an operation button for activating an application or instructing the start of read; 8, a USB interface cable; 20, a host computer; and 21, an operation window of application software.

Reference numeral 9 denotes a scanner controller for controlling the scanner 1; 10, a USB interface of the scanner 1; 22, a USB interface of the host computer 20; 23, a system driver for controlling each resource on the host computer 20; 24, a device driver for controlling the scanner 1 on the host computer 20; 25, a control panel of a management program for managing an operation environment such as termination of activation of application software on the host computer 20; 26, a toolbox of a control program for controlling application software for the scanner 1 on the host computer 20; and 27, a scanner controller that is an application program for image reading operation of the scanner 1.

In FIG. 2, when the operation button 7 is pressed, the scanner controller 9 is notified by an interrupt signal that the operation button 7 was pressed, and notifies the USB interface 22 of the host computer 20 of information "the scanner button was pressed" from the USB interface 10 via the USB interface cable 8 by interrupt transfer. The system driver 23 receives the information "the scanner button was pressed" from the USB interface 22, and notifies the device driver 24 of this. The device driver 24 instructs the control panel 25 to activate the toolbox 26. The toolbox 26 is activated from the control panel 25 and recognizes that the scanner button was pressed. If the scanner controller 27 is not activated, it is activated by the sequence of FIG. 5 (to be described later).

Figure 3:
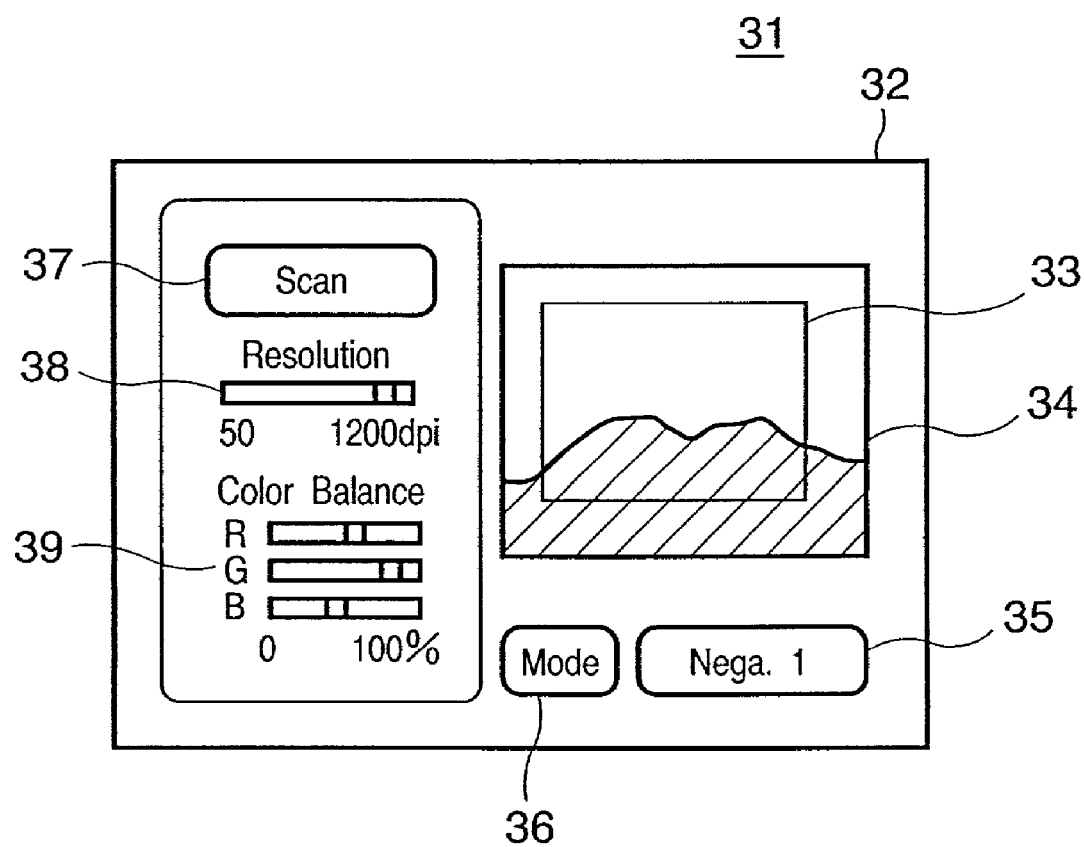
FIG. 3 is a view for explaining an operation window according to the first embodiment of the present invention.

FIG. 3 is a view for explaining the operation window of the scanner controller 27. This operation window is displayed on the screen of the host computer 20 in reading an image from a transparent material.

Reference numeral 31 denotes an operation window after preview that is displayed on the screen of the host computer 20; 32, a display window; 33, a cursor for performing cropping; 34, a preview window; 35, a reading mode setting button for setting the type of transparent original; 36, a mode setting button for setting a scan mode for gamma characteristics (density characteristic curve) and the like; 37, a main scan start button; 38, a resolution setting bar; and 39, a color balance setting bar. With a mouse (not shown) or the like, the buttons are clicked, the bars are dragged, and scan is started.

Figure 4:
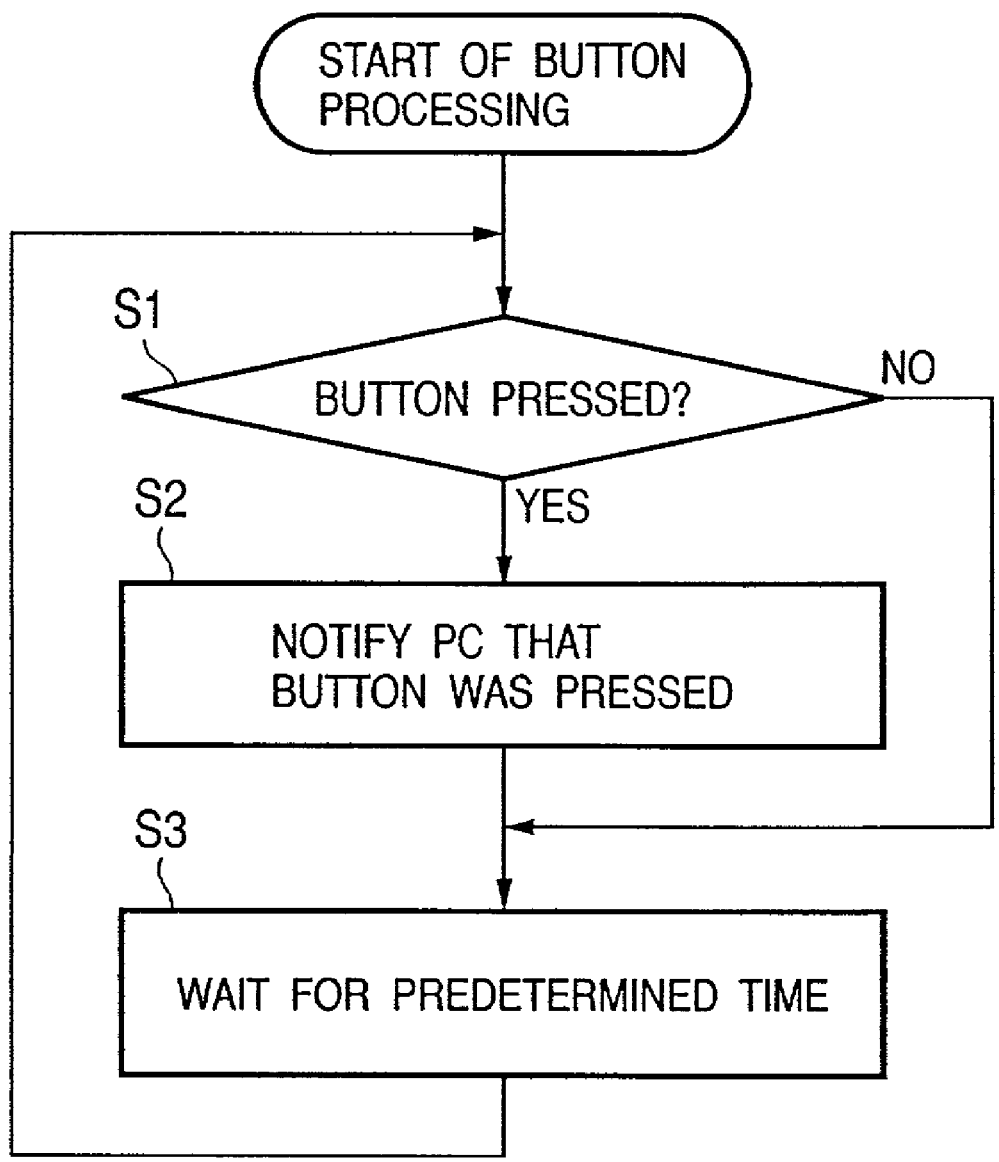
FIG. 4 is a flow chart showing a sequence in activating an application according to the first embodiment of the present invention.

FIG. 4 is a flow chart when button processing is processed by polling and the host is notified of this. The scanner controller 27 periodically checks the buttons.

After button processing starts, whether a button was operated is checked in step S1. If No in step S1, the flow shifts to step S3; or if Yes, to step S2 to notify the host computer that the button was operated.

In step S3, the flow waits for a predetermined time, e.g., 10 msec, using a timer of and then returns to step S1.

In determining in step S1 whether a button was clicked, the button is determined to have been clicked when the button has been clicked for a predetermined time after the button has not been clicked for a predetermined time. Alternatively, the button may be determined to have been clicked when the button has not been clicked for a predetermined time after the button has been clicked for a predetermined time.

FIG. 4 shows a method of processing button processing by polling, but the present invention may adopt a method of generating an interrupt to hardware in accordance with a button signal and processing button processing.

Figure 5:
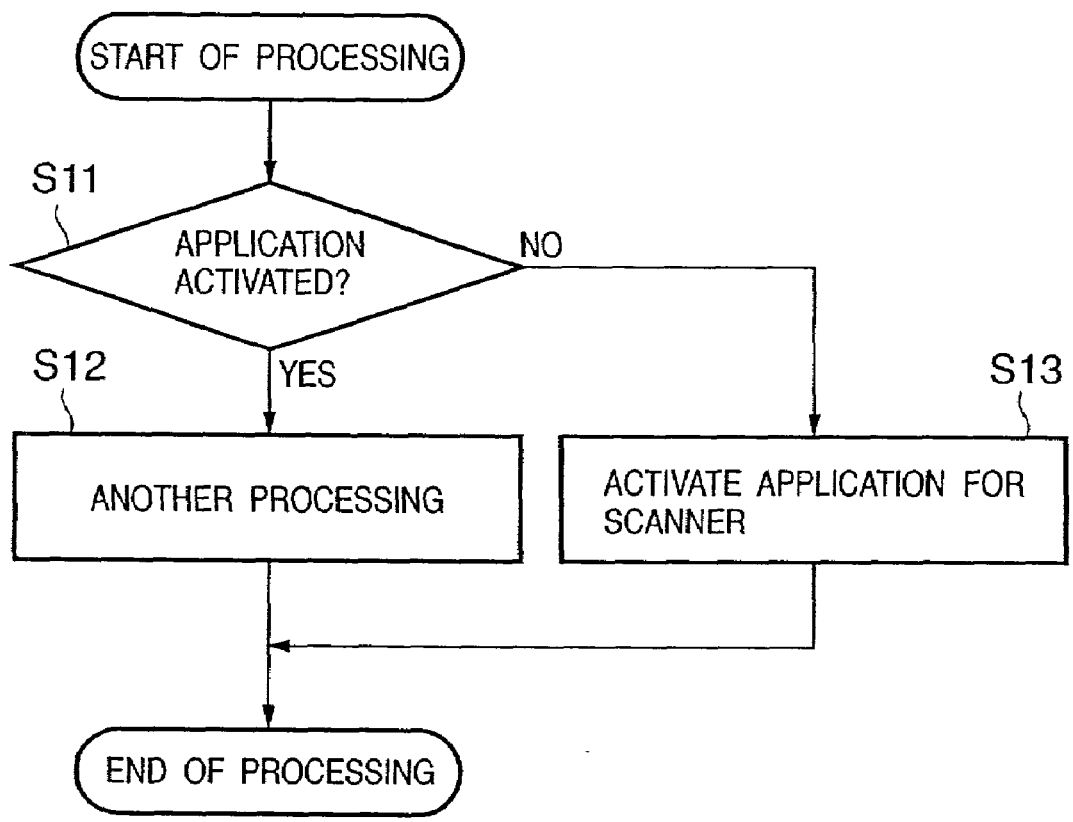
FIG. 5 is a flow chart showing another sequence in activating an application according to the first embodiment of the present invention.

FIG. 5 is a flow chart showing the processing sequence of the toolbox 26 for a control program of controlling application software of the scanner 1 on the host computer 20.

If the toolbox 26 is activated by the control panel 25, whether the scanner controller 27 has been activated is checked (step S11). If Yes in step S11, processing coping with another activation factor is performed (step S12); and if No, the flow advances to step S13. In step S13, the scanner controller 27 is activated.

Figure 6:
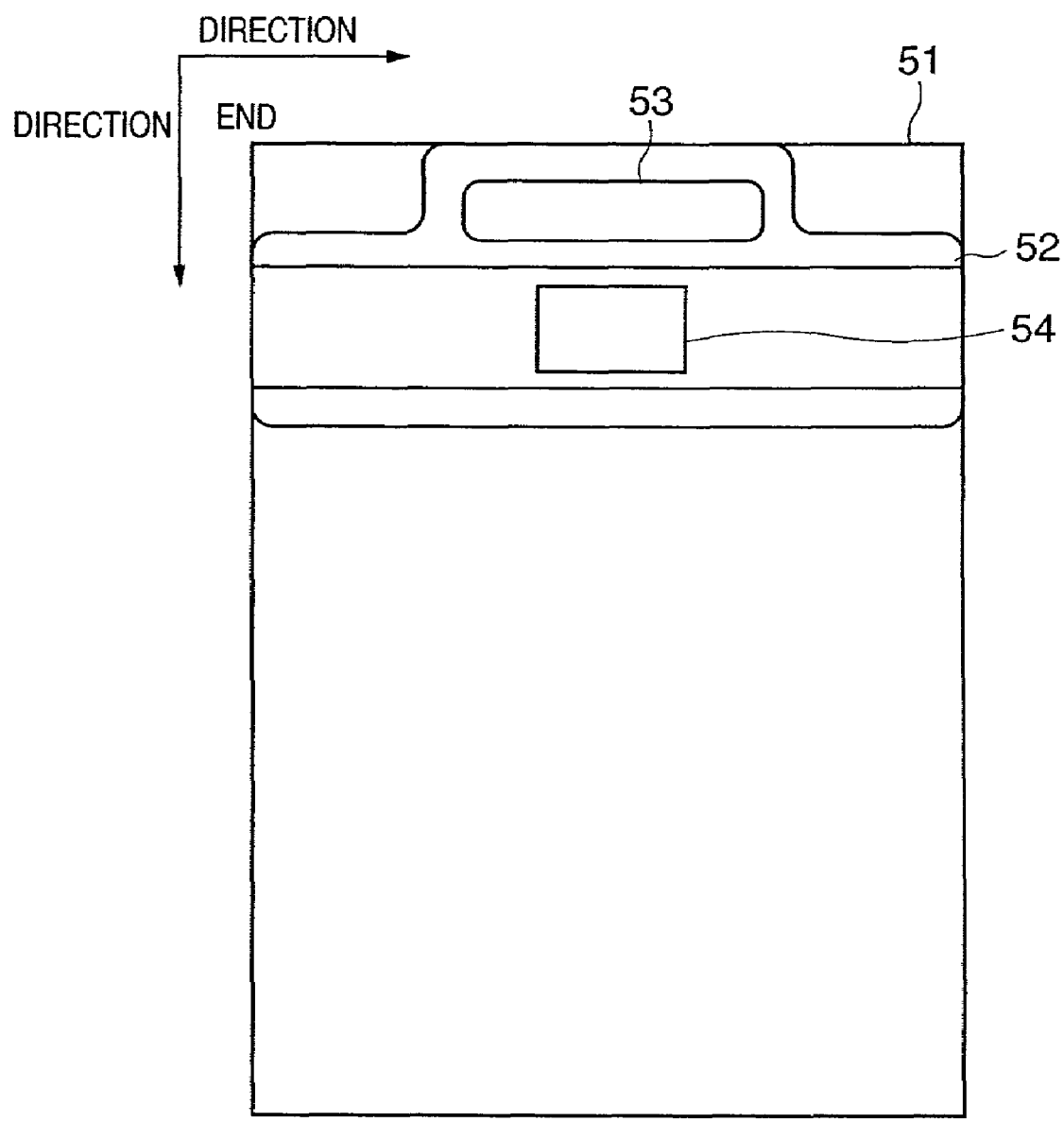
FIG. 6 is a schematic view showing the relationship between a film holder and an original reading position according to the first embodiment of the present invention.

FIG. 6 is a view showing the relationship between the film holder and the original reading position. In FIG. 6, reference numeral 51 denotes a platen glass; 52, a film holder; 53, a calibration opening formed in the film holder for calibration; and 54, an image reading opening used upon reading a transparent original. The opening 53 is used for calibration as well as an index set near the original image reading portion of an image sensing element. The edge of the opening 53 is an index for determining the reading start position, as will be described later.

The film holder 52 is mounted on the platen glass 51 so as to set the calibration opening close to the leading end of an image. In the first embodiment, the end of the film holder 52 is put against that of the platen glass 51, as shown in FIG.

6. In this state, the light box is properly positioned with respect to the calibration opening 53 and image reading opening 54.

Although the distance between the ends of the film holder 52 and platen glass 51 may be freely changed, the positional precision of the film holder 52 increases by urging the film holder 52 against the end of the platen glass 51.

Figure 7:
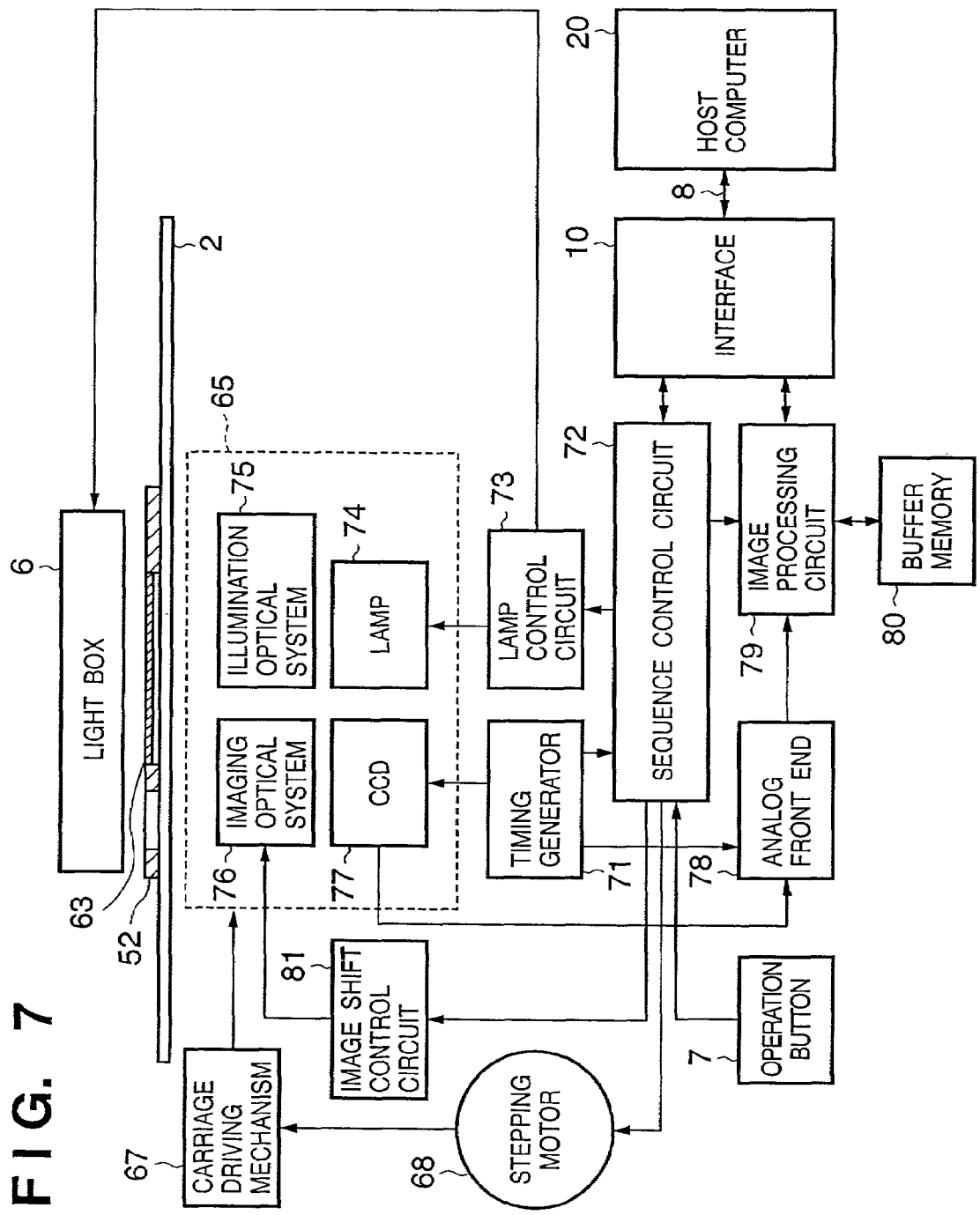
FIG. 7 is a block diagram showing the arrangement of an image reading apparatus according to the first embodiment of the present invention.

FIG. 7 is a block diagram showing an image reading apparatus according to the first embodiment of the present invention. The same reference numerals as in the above-described arrangement denote the same parts.

Referring to FIG. 7, reference numeral 2 denotes the platen glass; 6, the light box for illuminating the surface of a transparent original; 8, the USB interface cable; 10, the USB interface; and 20, the host computer for executing a scanner control program; 63, a transparent original such as a film; 52, a film holder for holding the transparent original; 65, a carriage driven in the sub-scan direction; 67, a carriage driving mechanism for transmitting driving force to the carriage and moving it; 68, a stepping motor for driving the carriage 65 via the carriage driving mechanism 67 in the sub-scan direction; 71, a timing generator; 72, a sequence control circuit (corresponding to the scanner controller 9 in FIG. 1) for performing a series of sequence control operations such as motor control and lamp ON/OFF control in accordance with values set from the host computer 20 via the USB interface 10; 73, a lamp control circuit for controlling a lamp ON/OFF state; 74, a lamp for a reflecting original; 75, an illumination optical system for illuminating the reflecting original; 76, an imaging optical system which guides the image of an original on the platen glass 2 onto an image sensing element and is constituted to enable pixel shifting operation; 77, a CCD line sensor (image sensing element) of 600-dpi; 78, an analog circuit (generally called "an analog front end") including an A/D converter for converting an analog signal output from the image sensing element into a digital signal; 79, an image processing circuit for performing shading correction, gamma correction, scaling processing, and the like; 80, a buffer memory used to perform image processing and transfer image data; and 81, an image shift control circuit for controlling the imaging optical system 76 for pixel shifting operation in the main scan direction.

The carriage 65 is an integral optical system including the lamp 74 for illuminating a reflecting original, the illumination optical system 75, the imaging optical system 76, and the image sensing element 77 such as a CCD. The sequence control circuit 72 controls the stepping motor 68 in accordance with values set from the host computer 20 via the USB interface 10, and moves the carriage in the sub-scan direction via the carriage driving mechanism 67.

The imaging optical system 76 can slightly move the position of an image projected on the image sensing element in the main scan direction by changing the slope angle of a parallel-plate glass inserted in the optical axis. This realizes pixel shifting operation. In this embodiment, the pixel shift amount is a ½ pixel for descriptive convenience. For a smaller pixel shift amount (e.g., ⅓ pixel or ¼ pixel), a higher-resolution image can be attained.

Figure 8:
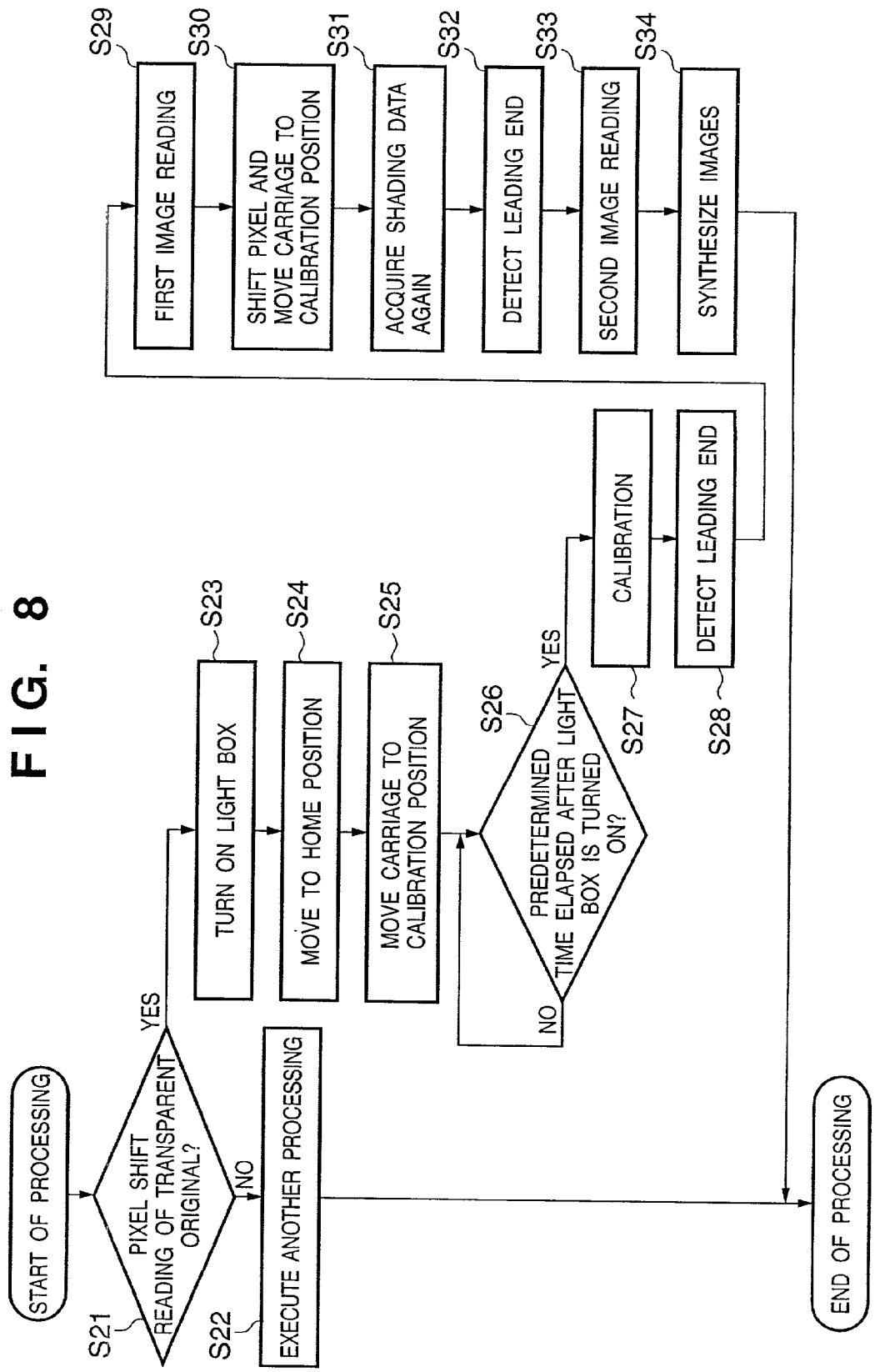
FIG. 8 is a flow chart showing a control program for controlling a reading operation on a host computer according to the first embodiment of the present invention.

FIG. 8 is a flow chart showing a control program in reading an image by pixel shifting operation.

If the operation button 7 on the front surface of the main body is pressed, the sequence control circuit 72 (or scanner controller 9) notifies the host computer 20 by interrupt transfer via the USB interface 10 that the operation button 7 was pressed. The host computer 20 receives the notification via the interface 22, and notifies the scanner controller 27 of this via the system driver 23, device driver 24, control panel 25, and toolbox 26. After the scan controller 27 is notified that the operation button 7 was pressed, or the scan button 37 on the operation window shown in FIG. 3 is detected to be clicked, image reading processing starts, and whether the current mode is a reading mode which requires pixel shifting operation is checked (step S21).

For descriptive convenience, the first embodiment executes pixel shifting operation in reading a transparent original at a resolution of 600 dpi or more. For example, when a transparent original is to be read in a color mode at 1,200 dpi, the determination in step S21 is Yes, and the flow advances to step S23. When a transparent original is to be read at 300 dpi or a reflecting original is to be read at 900 dpi, the determination in step S21 is No, and the flow advances to step S22 to execute another necessary processing. This processing is irrelevant to the present invention, and a description thereof will be omitted.

In reading of a transparent original that requires pixel shifting operation, the light box 6 is turned on by the sequence control circuit 72 via the lamp control circuit 73 (step S23). The stepping motor 68 is driven to move the carriage 65 to a home position serving as a sub-scan reference position via the carriage driving mechanism 67 (step S24). Then, the carriage is moved to the position of the calibration opening 53 of the film holder (step S25). At this time, the carriage is moved to a rough position by rotating the motor by a predetermined number of steps as a moving amount.

The flow waits for a predetermined time until the lamp stabilizes after the light box 6 is turned on (step S26), and then calibration starts (step S27). In calibration, a lamp light quantity and exposure amount necessary for reading are determined in accordance with the reading mode. At the same time, black level data and shading data are read, and the black offset level is set in the image processing circuit 79. Further, black level correction data and shading correction data are written in the buffer memory 80 via the image processing circuit 79.

An image near the edge of the calibration opening 53 is read as a feature point, detecting the edge position. Since the distance from the edge position to the leading end of the transparent original is determined by the holder, the remaining number of steps up to the leading end of the image of the transparent original is calculated (step S28).

The first image reading is done from the calculated leading end position, and the read image data is transferred to the host computer 20 (step S29). After the first reading ends, the imaging position of the imaging optical system 76 is shifted by a ½ pixel in the main scan direction via the pixel shift control circuit 81, and the carriage 65 is returned to the calibration position (*step* S30).

Shading data is acquired again, and shading correction data is written in the buffer memory 80 via the image processing circuit 79 (step S31).

The leading end is detected again. The edge position is detected within a narrower range limited on the basis of the previous edge position. Similarly, the remaining number of steps up to the leading end of the image of the transparent original is calculated (step S32).

The second image reading is performed from the calculated leading end position, and the read image data is transferred to the host computer 20 (step S33). After the second reading ends, the imaging position of the imaging optical system 76 is returned by a ½ pixel in the main scan direction via the pixel shift control circuit 81, and the carriage 65 is returned to the calibration position. The host computer 20 synthesizes the image data read by the first and second reading operations (step S34), and reading operation ends.

(Second Embodiment)

Figure 9:
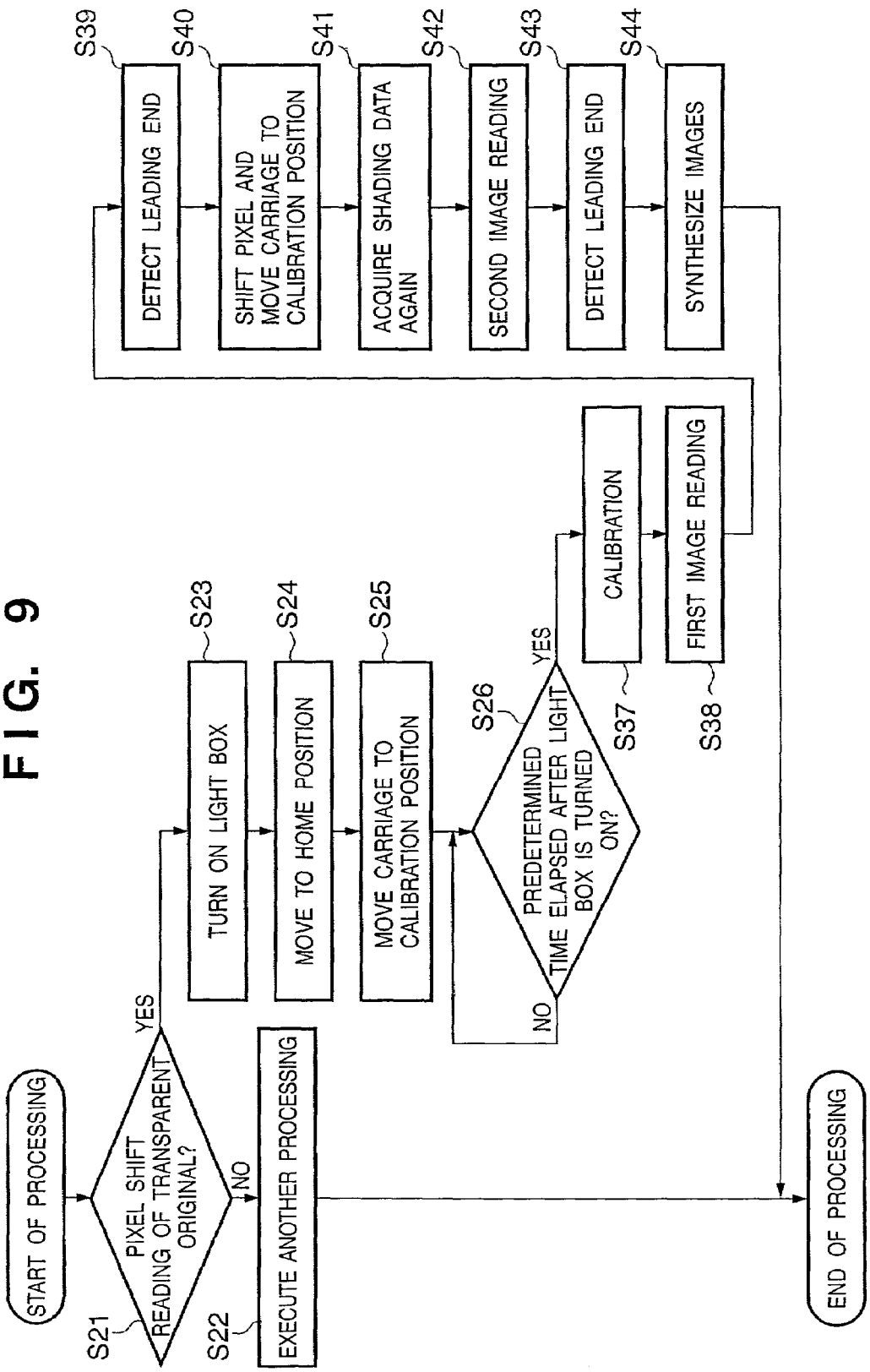
FIG. 9 is a flow chart showing a control program for controlling a reading operation on a host computer according to a second embodiment of the present invention.

FIG. 9 is a flow chart according to the second embodiment of the present invention, and is a flow chart showing a control program in reading an image by pixel shifting operation. The arrangements of an image reading apparatus and host computer are the same as those described in the first embodiment, and a description thereof will be omitted.

Processing up to step S26 in the flow chart of FIG. 9 is the same as the flow chart according to the first embodiment in FIG. 8, and a description thereof will be omitted.

The flow waits for a predetermined time until the lamp stabilizes after a light box 6 is turned on (step S26), and then calibration starts (step S37). In calibration processing, a lamp light quantity and exposure amount necessary for reading are determined in accordance with the reading mode. At the same time, black level data and shading data are read, and the black offset level is set in an image processing circuit 79. Further, black level correction data and shading correction data are calculated and stored in a host computer 20.

The first image reading is done from a position near the edge of a calibration opening 53, and the read image data is transferred to the host computer 20. The host computer 20 stores the received image data in a memory (not shown) (step S38). After the first reading ends, the edge position of the opening is detected from the read image data. Since the distance from the edge position to the leading end of the transparent original is determined by the holder, the number of lines up to the leading end of the transparent image is calculated (step S39).

The imaging position of an imaging optical system 76 is shifted by a ½ pixel in the main scan direction via a pixel shift control circuit 81, and a carriage 65 is returned to the calibration position (step S40).

Black level data and shading data are read again, and the black offset level is set in the image processing circuit 79. Black level correction data and shading correction data are calculated and stored in the memory of the host computer 20 (step S41).

The second image reading is done from a position a predetermined number of lines (e.g., 5 lines) before the leading end position calculated from the image data of the first reading, and the read image data is transferred to the host computer 20. The host computer 20 stores the received image data in the memory. After the second reading ends, the imaging position of the imaging optical system 76 is returned by ½ pixel in the main scan direction via the pixel shift control circuit 81, and the carriage 65 is returned to the calibration position (*step* S42).

After the second reading ends, the edge position of the opening 53 is detected from the read image data. Since the distance from the edge position to the leading end of the transparent original is determined by the holder, the number of lines up to the leading end of the image of the transparent original is calculated (step S43).

The image data read by the first and second reading operations undergo necessary image processes corresponding to the reading mode, such as black level correction, shading correction, gamma adjustment, color balance adjustment, masking, scaling, and cropping. Then, the image data are synthesized by the host computer 20 on the basis of the leading end positions of the images obtained in steps S39 and S43 (step S44), and reading operation ends.

A sufficiently large range including a necessary reading range is read in the first image reading, and the reading range is reset narrower in the second image reading on the basis of the leading end position detected from the image data of the first image reading. This can reduce the necessary reading time of the second image reading and the memory capacity.

Figure 10:
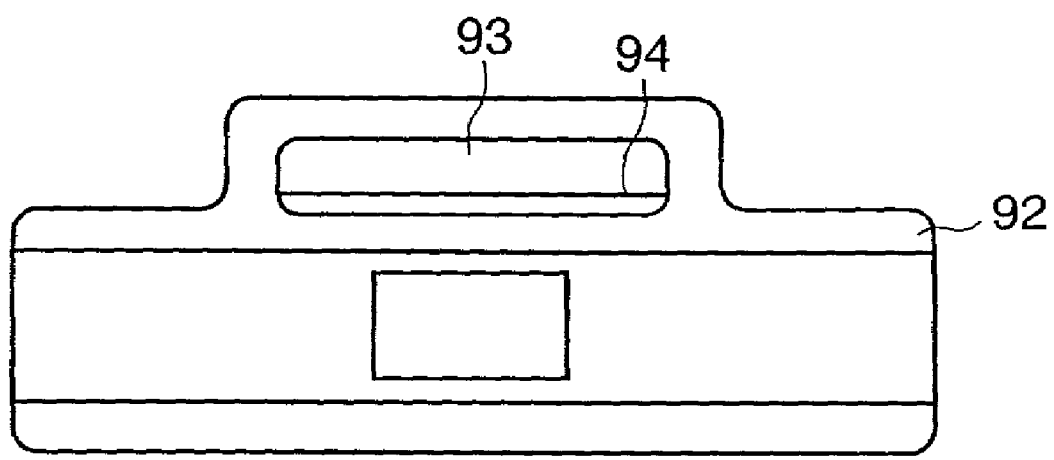
FIG. 10 is a schematic view showing another example of a film holder according to the second embodiment of the present invention.

FIG. 10 is a schematic view showing another example of the film holder in the second embodiment.

In FIG. 10, reference numeral 92 denotes a film holder; and 93, a transparent portion for calibration in which a glass is fit.

Reference numeral 94 denotes a linear mark which is attached to the back surface of the glass and serves as an index attached to the transparent portion 93 in order to indicate an end. In this case, the position of the line can be used as an end position, which can simplify the end detection algorithm and can increase the end position precision.

Figure 11:
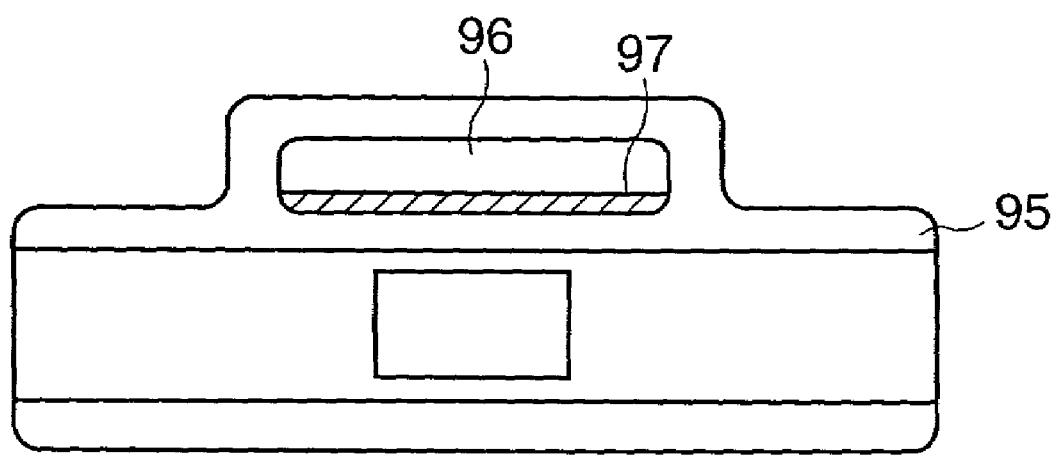
FIG. 11 is a schematic view showing still another example of a film holder according to the second embodiment of the present invention.

FIG. 11 is a schematic view showing still another example of the film holder in the second embodiment. In FIG. 11, reference numeral 95 denotes a film holder; 96, a calibration opening; and 97, a black band-like sheet which is bonded to the back surface of the film holder so as to slightly protrude to the calibration opening 96. The black sheet 97 is used to read black data, and its edge position is used as an end position. Bonding the black sheet enables detecting the end position with higher precision.

According to the present invention, the index set near the reading portion of an original image, e.g., the feature point of the calibration opening formed in the film holder for holding a transparent original is detected, the reading start position of the original image is determined based on the feature point, and a synthesized image is created. Thus, the image reading resolution can be increased with high precision under simple control using a conventional control mechanism without causing misalignment in image synthesis.

The first and second embodiments have exemplified the method of realizing pixel shifting operation by controlling the imaging optical system 76 and shifting the imaging position of the optical image of an original image on the CCD 77. However, the present invention is not limited to this, and can employ various known pixel shift methods such that the CCD position is changed between the first reading operation and the second and subsequent reading operations, shifting the relative positions of the optical image of an original image and the CCD.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flow charts FIG. 8 or 9 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image reading method of reading by an image sensing element an original held by an original holder while shifting pixels, comprising:
   a first detection step of detecting a feature point of the original holder;
   a first reading step of specifying a position of the original on the basis of the feature point detected in the first detection step and reading the original;
   a pixel shifting step of shifting relative positions of an optical image of the original and the image sensing element by a predetermined amount;
   a second detection step of detecting the feature point of the original holder at the position shifted in the pixel shift step;
   a second reading step of specifying the position of the original on the basis of the feature points detected in the second detection step and reading the original; and
   a synthesis step of synthesizing the images read in the first and second reading steps;
   wherein the original holder includes a film holder, and the feature point includes a feature point of an opening formed in the film holder for calibration.

2. The method according to claim 1, wherein the feature point of the opening includes an edge of the opening.

3. The method according to claim 1, wherein the feature point of the opening includes a straight line formed at the opening.

4. The method according to claim 1, wherein the feature point of the opening includes an edge of a shielding member attached to the opening.

5. An image reading method of reading by an image sensing element an original held by an original holder while shifting pixels, comprising:
   a first reading step of reading the original and predetermined region including a feature point of the original holder;
   a first detection step of detecting the feature point of the original holder from image data of the original read in the first reading step;
   a pixel shifting step of shifting relative positions of an optical image of the original and the image sensing element by a predetermined amount;
   a second reading step of reading the original and the predetermined region including the feature point of the original holder at the position shifted in the pixel shift step;
   a second detection step of detecting the feature point of the original holder from image data of the original read in the second reading step; and
   a synthesis step of synthesizing the images read in the first and second reading steps on the basis of the feature points of the image holder that are detected in the first and second detection steps.

6. The method according to claim 5, wherein the original holder includes a film holder, and the feature point includes a feature point of an opening formed in the film holder for calibration.

7. The method according to claim 6, wherein the feature point of the opening includes an edge of the opening.

8. The method according to claim 6, wherein the feature point of the opening includes a straight line formed at the opening.

9. The method according to claim 6, wherein the feature point of the opening includes an edge of a shielding member attached to the opening.

10. The method according to claim 5, wherein in the second reading step, the region read in the first reading step is limited to a narrower region on the basis of the image data read in the first reading step, and the restricted region is read.

11. An image reading apparatus comprising:
    an original holder for holding an original;
    an image sensing element;
    a detector for detecting a feature point of said original holder;
    a pixel shifting circuit for shifting relative positions of an optical image of the original and said image sensing element by a predetermined amount;
    a controller for causing said detector to detect the feature point, specifying a position of the original on the basis of the detected feature point, and causing said image sensing element to read the original before said pixel shifting circuit shifts the relative positions and every time said pixel shifting circuit shifts the relative positions; and
    a synthesizer for synthesizing original names read by said image sensing element at a plurality of relative positions;
    wherein said original holder includes a film holder, and the feature point includes a feature point of an opening formed in the film holder for calibration.

12. The apparatus according to claim 11, wherein said original holder is detachable.

13. The apparatus according to claim 11, wherein the feature point of the opening includes an edge of the opening.

14. The apparatus according to claim 11, wherein the feature point of the opening includes a straight line formed at the opening.

15. The apparatus according to claim 11, wherein the feature point of the opening includes an edge of a shielding member attached to the opening.

16. The apparatus according to claim 11, wherein said pixel shifting circuit shifts the relative positions of the optical image and said image sensing element by shifting an optical path of the optical image of the original.

17. The apparatus according to claim 11, wherein said pixel shifting circuit shifts the relative positions of the optical image and said image sensing element by moving a position where said image sensing element reads the optical image of the original.

18. An image reading apparatus comprising:
an original holder for holding an original;
an image sensing element;
a pixel shifting circuit for shifting relative positions of an optical image of the original and said image sensing element by a predetermined amount;
a controller for causing said image sensing element to read the original and predetermined region including a feature point of said original holder before said pixel shifting circuit shifts the relative positions and every time said pixel shifting circuit shifts the relative positions;
a detector for detecting the feature point of said original holder on the basis of image data of the read original; and
a synthesizer for synthesizing original images read by said image sensing element at a plurality of relative positions on the basis of the basis of the feature point detected by said detector.

19. The apparatus according to claim 18, wherein said original holder is detachable.

20. The apparatus according to claim 18, wherein said original holder includes a film holder, and the feature point includes a feature point of an opening formed in the film holder for calibration.

21. The apparatus according to claim 20, wherein the feature point of the opening includes an edge of the opening.

22. The apparatus according to claim 20, wherein the feature point of the opening includes a straight line formed at the opening.

23. The apparatus according to claim 20, wherein the feature point of the opening includes an edge of a shielding member attached to the opening.

24. The apparatus according to claim 18, wherein said pixel shifting circuit shifts the relative positions of the optical image and said image sensing element by shifting an optical path of the optical image of the original.

25. The apparatus according to claim 18, wherein said pixel shifting circuit shifts the relative positions of the optical image and said image sensing element by moving a position where said image sensing element reads the optical image of the original.

26. The apparatus according to claim 18, wherein said controller limits the region, read after the relative positions are shifted, to a narrower region on the basis of image data of the original read before the relative positions are shifted, and reads the limited region.

27. A computer program product comprising a computer readable medium having computer readable program code means embodied in said medium for reading by an image sensing element an original held by an original holder while shifting pixels, said product including:
first computer readable program code means for detecting a feature point of the original holder;
second computer readable program code means for specifying a position of the original on the basis of the detected feature point and reading the original;
third computer readable program code means for shifting relative positions of an optical image of the original and the image sensing element by a predetermined amount;
fourth computer readable program code means for detecting the feature point of the original holder at the shifted position;
fifth computer readable program code means for specifying the position of the original on the basis of the detected feature points and reading the original; and
sixth computer readable program code means for synthesizing the read images,
wherein the original holder includes a film holder, and the feature point includes a feature point of an opening formed in the film holder for calibration.

28. A computer program product comprising a computer readable medium having computer readable program code means embodied in said medium for reading by an image sensing element an original held by an original holder while shifting pixels, said product including:
first computer readable program code means for reading the original and predetermined region including a feature point of the original holder;
second computer readable program code mans for detecting the feature point of the original holder from read image data of the original;
third computer readable program code means for shifting relative positions of an optical image of the original and the image sensing element by a predetermined amount;
fourth computer readable program code means for reading the original and the predetermined region including the feature point of the original holder at the shifted position;
fifth computer readable program code means for detecting the feature points of the original holder from read image data of the original; and
sixth computer readable program code means for synthesizing the read images read on the basis of the detected feature points of the image holder.

* * * * *